(No Model.) 5 Sheets—Sheet 1.

H. F. BROWN.
ORE ROASTING FURNACE.

No. 489,143. Patented Jan. 3, 1893.

Witnesses
Chapman W. Fowler
Thomas Rout Jr.

Inventor
Horace F. Brown
By his Attorneys
A. H. Evans & Co.

(No Model.)

5 Sheets—Sheet 2.

H. F. BROWN.
ORE ROASTING FURNACE.

No. 489,143.

Patented Jan. 3, 1893.

Witnesses
Chapman W. Fowler
Thomas J. Rout Jr.

Inventor
Horace F. Brown
By his Attorneys
A. H. Evans & Co.

(No Model.) H. F. BROWN.
ORE ROASTING FURNACE.

No. 489,143. Patented Jan. 3, 1893.

Fig. 10.ᵃ

Witnesses
Chapman W. Fowler.
Thomas J. Rout Jr.

Inventor
Horace F. Brown
By his Attorneys
A. H. Evans & Co.

(No Model.)　　　　　　　　H. F. BROWN.　　　　　　5 Sheets—Sheet 4.
ORE ROASTING FURNACE.

No. 489,143.　　　　　　　　　　　　Patented Jan. 3, 1893.

(No Model.) 5 Sheets—Sheet 5.

H. F. BROWN.
ORE ROASTING FURNACE.

No. 489,143. Patented Jan. 3, 1893.

UNITED STATES PATENT OFFICE.

HORACE F. BROWN, OF BUTTE, MONTANA, ASSIGNOR TO MARY C. BROWN, OF CHICAGO, ILLINOIS.

ORE-ROASTING FURNACE.

SPECIFICATION forming part of Letters Patent No. 489,143, dated January 3, 1893.

Application filed April 11, 1892. Serial No. 428,749. (No model.)

*To all whom it may concern:*

Be it known that I, HORACE F. BROWN, a citizen of the United States, residing at Butte, in the county of Silver Bow and State of Montana, have invented certain new and useful Improvements in Ore-Roasting Furnaces, as set forth in the accompanying drawings, forming part of this specification, in which—

Figure 1:
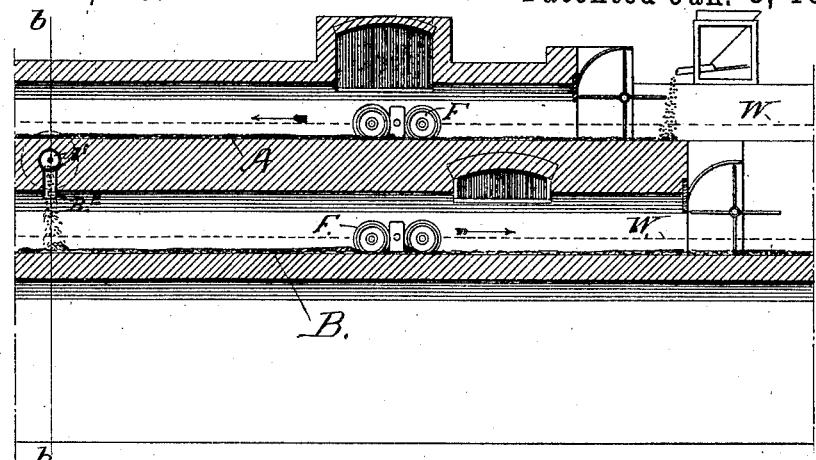
Figure 2:
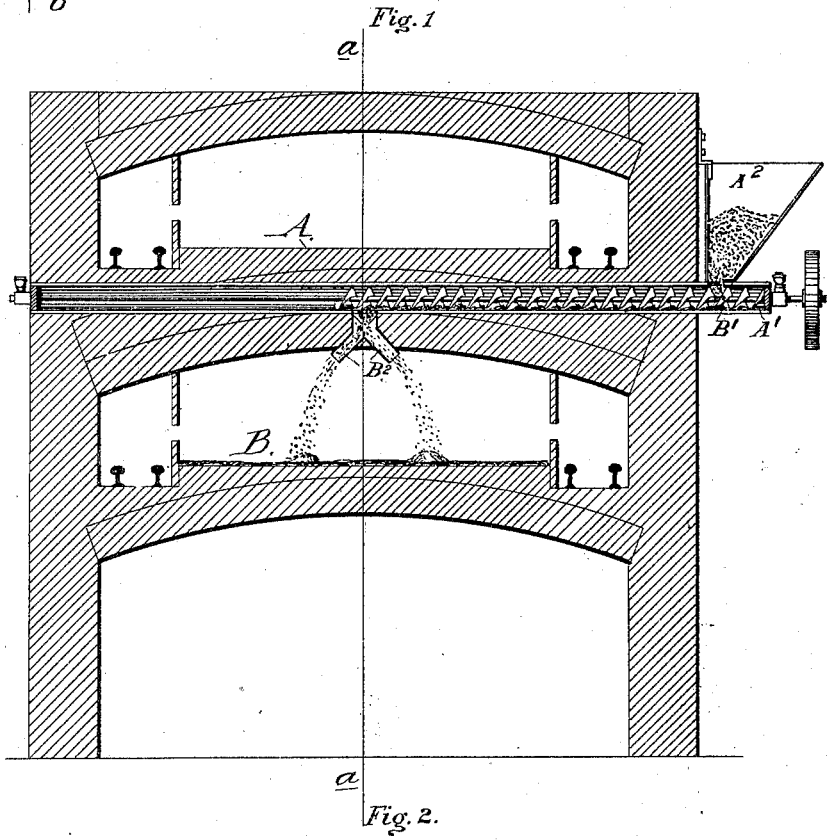
Figure 3:
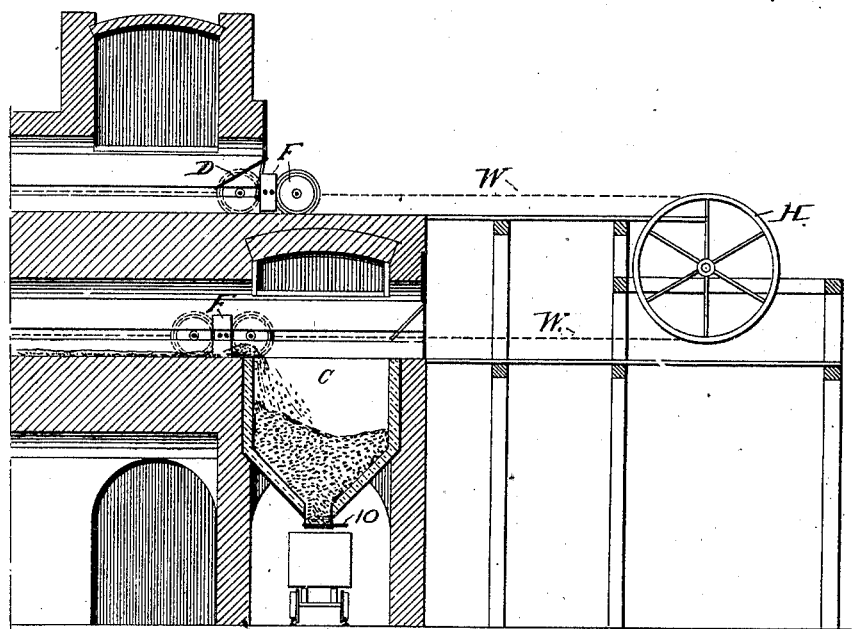
Figure 4:
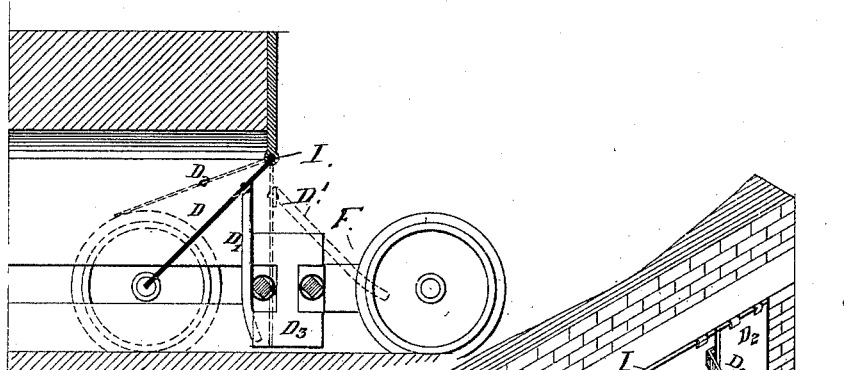
Figure 5:
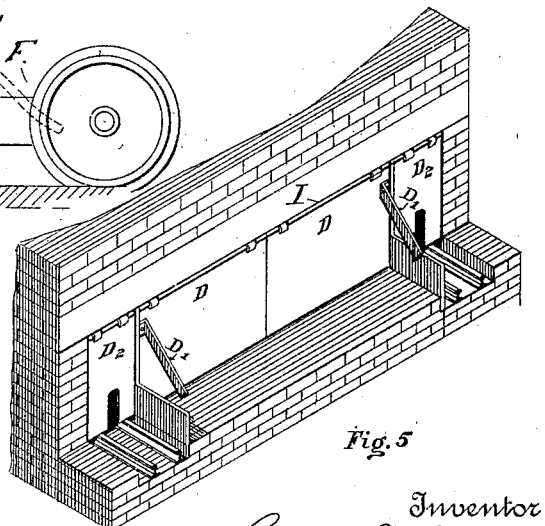
Figure 6:
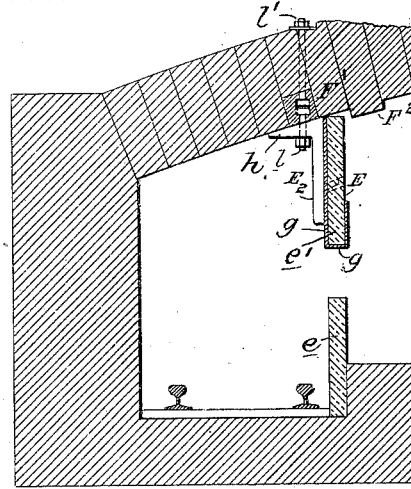
Figure 7:
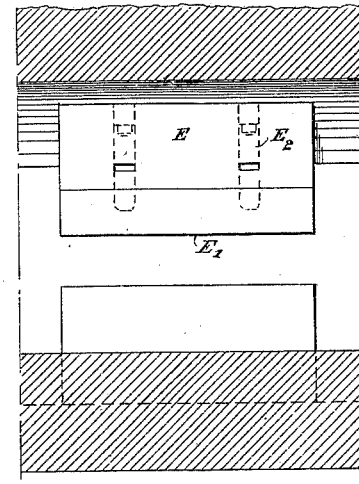
Figure 10:
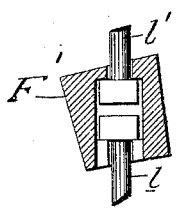
Figure 10:
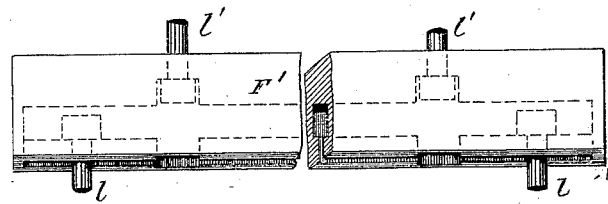
Figure 9:
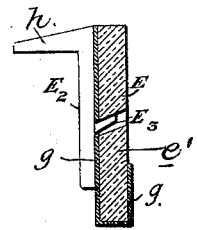
Figure 8:
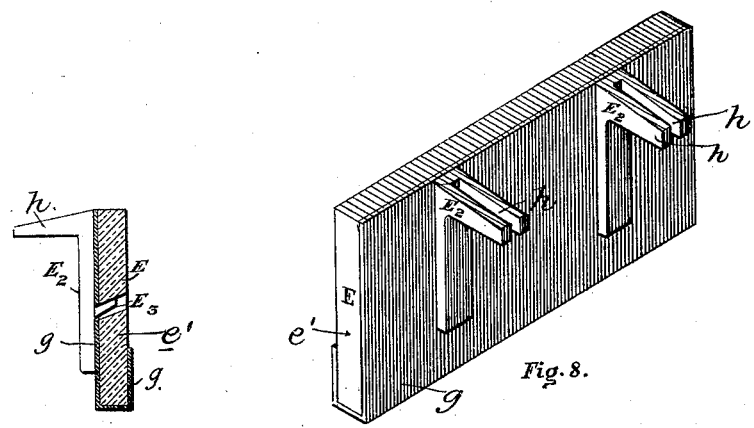
Figure 11:
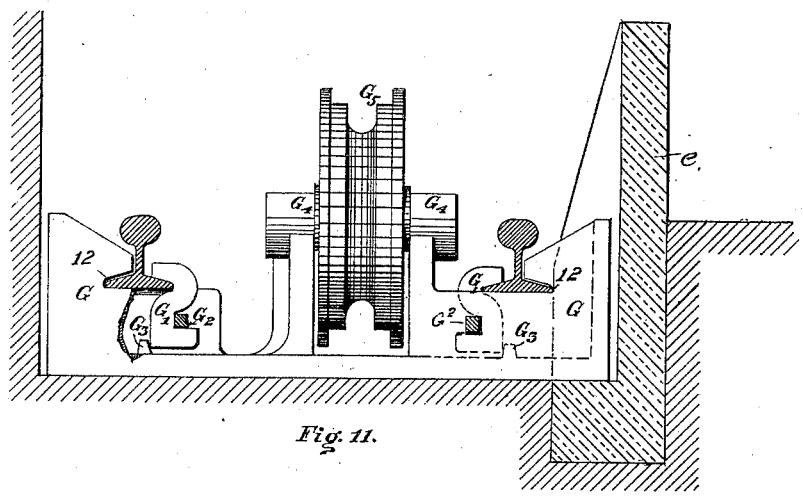
Figure 12:
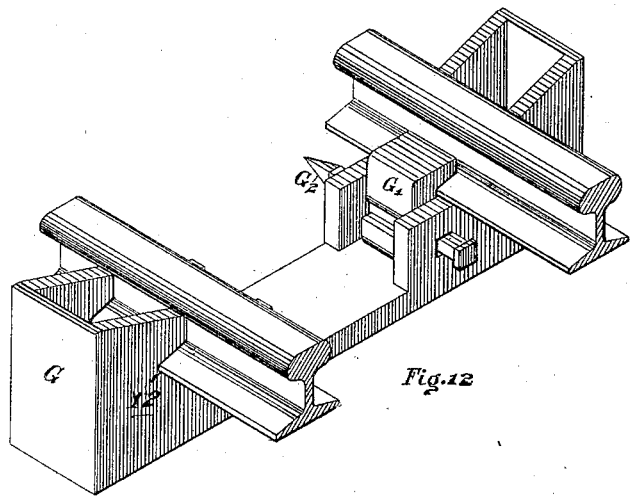
Figure 13:
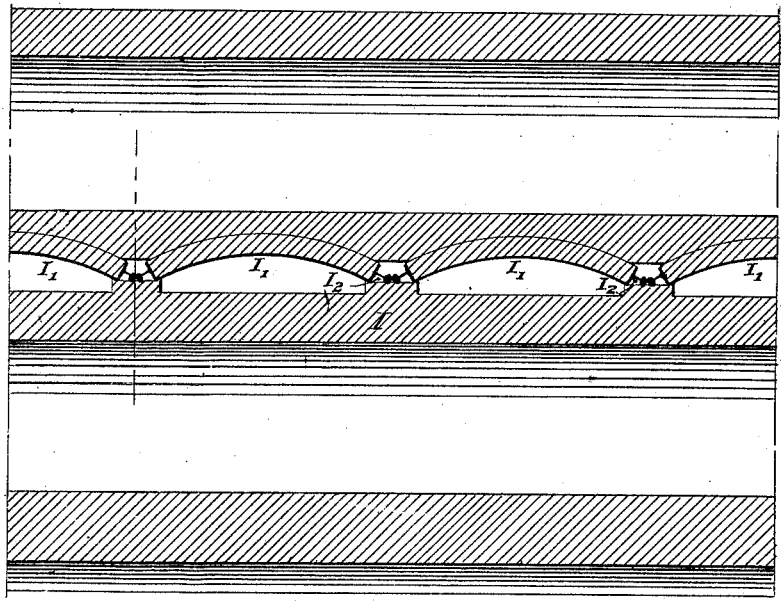
Figure 14:
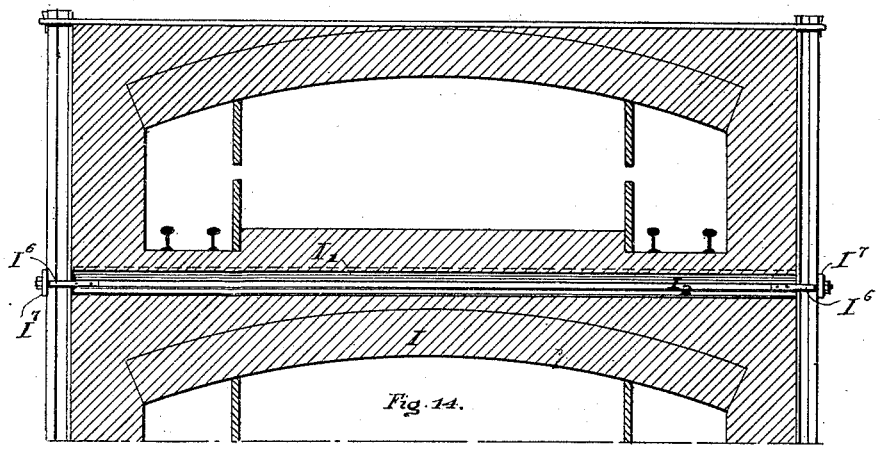
Figure 15:
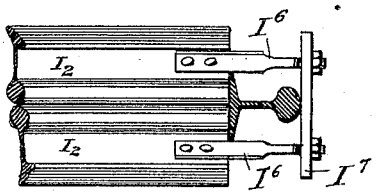

Figure 1, is a longitudinal sectional view on the line $a$—$a$ of Fig. 2 showing one end of the furnace. Fig. 2, is a cross sectional view of the same on the line $b$—$b$ of Fig. 1. Fig. 3, is a longitudinal sectional view of one end of the furnace showing a means for storing the calcined ores in connection with the flue from the fire box, so that the same may be drawn off in charges and transported to the reducing furnaces while in a heated condition. Fig. 4, is a sectional view showing one of the doors at the ends of the furnace. Fig. 5, is a perspective view of the doors. Fig. 6, is a transverse sectional view taken through one of the supplemental chambers at the sides of the main roasting hearth and showing the construction of the wall or partition which forms said chamber. Fig. 7, is a longitudinal sectional view of the same. Figs. 8, 9, 10 and $10^a$ are details of said wall or partition. Fig. 11, is a transverse sectional view through the supplemental side compartment or chamber showing one of the chain supporting rollers, the track rails, and means for securing the same. Fig. 12, is a perspective view of the rails, with their supporting chair and adjunctive parts. Fig. 13, is a longitudinal sectional view through a portion of the furnace showing the construction of the wall or partition between the upper and lower hearths. Fig. 14, is a transverse sectional view of the same on the line $c$—$c$ of Fig. 13. Fig. 15, is a detail showing in perspective the rods $I^2$ and connections.

My invention relates to ore roasting furnaces generally, and particularly to that class having upper and lower horizontal compartments forming the main roasting hearths, connected one with the other, and employing carriages provided with means for advancing and stirring the ore. It is an improvement on my former patent No. 402,619 granted to me March 22, 1892, and on the application filed by me December 8, 1891, Serial No. 414,359.

The object of my invention is to improve the furnaces described and shown in said patent and former application, especially as to the details of the same, and therefore my invention consists of the constructions and combinations of the devices which I shall hereinafter fully describe and claim.

To enable others skilled in the art to which my invention appertains to make and use the same, I will now describe its construction and indicate the manner in which the same is carried out.

In the proper treatment of ores, it is advantageous and even necessary to mix various kinds of ores together to obtain a proper combination for "fluxing." In ores carrying a high per cent. of sulphur, such as sulphides of iron and copper, a considerable time is necessary for burning off the excess of sulphur; to do this the ore is slowly moved the entire length of two hearths of the furnaces, and by being so frequently stirred and exposed to the heat and oxygen, the sulphur is practically eliminated. For the economical after treatment of this ore, it is necessary to add a very silicious ore carrying little or no sulphur. If this latter ore should be fed in with the sulphide ores through the hopper or feeder it would necessitate the moving and stirring of the whole mass the entire length of the furnace, but as it is only required to thoroughly heat and mix said ore, it is only necessary that it should travel but a short distance through the furnace.

The furnace herein shown is constructed of the usual materials, and is made with two separate hearths A and B one located over the other, and connected therewith by means of an opening as usual whereby the ore is discharged from the upper compartment or hearth to the lower, and is finally conveyed to the cooling floors in the usual manner.

In order that the silicious ores may be introduced at the proper point, I let into the wall or partition between the two hearths a transverse pipe A' within which is suitably journaled a screw conveyer B' of any desired form, and connect one end of the pipe A' with the discharge chute of a hopper $A^2$ which leads through the roof or arch of the hearth whereby the ore delivered from said hopper is advanced by the screw conveyer toward the center of the roasting hearth, and is discharged through a chute or spout, as for instance the double or bifurcated spout B², let through the arch or roof of the lower hearth, and is discharged onto the said hearth in sufficient quantities to form the exact proportion needed for a proper and successful smelting charge, and where it becomes heated and thoroughly mixed with the roasting ores. It is obvious that flue dust and other substances may likewise be introduced, as also salt for chloridizing purposes.

In order that the ores may be properly stored, after being roasted and mixed, until needed for being charged into the matting or fusing furnace, I employ the means shown in Fig. 3, in which C represents a hopper constructed preferably within the end walls of the furnace and immediately under the inlet arch from the first fire boxes. The ore is discharged into this hopper by means of the carriages F, which are provided with suitable stirrers, and are operated by means of the endless chains G passing over end pulleys or drums H in the manner described and claimed in my said former patent.

The ore at a red heat, is fed into the hopper C by the stirring devices as they pass the inlet of the hopper, and is maintained in this heated condition by the heat from the fire box until required for use when it is drawn off in charges, into suitable cars and transported to the furnace for melting. The hopper has a gate or valve 10 in its discharge spout, which is opened to permit the desired charge to pass to the car beneath.

The foregoing construction enables me to work the ore in charges, a feature especially desirable in the matting or fusing furnaces, and also enables me to work the ore while in a heated condition, which saves time and expense of reheating.

To prevent a too free influx of outside air into the roasting chambers, and the subsequent cooling of the furnace, it is necessary to close the two ends of the hearths by means of suitable doors. One form of these doors is fully disclosed in my said former patent, and a new and very desirable form is shown in Figs. 4 and 5 of the accompanying drawings. In said figures a transverse rod I is journaled across the ends of the furnace, and upon this rod the sheet metal doors D and D² are hung, said doors D closing the ends of the hearths, while the doors D² close the ends of the supplemental chambers along the sides of the main chambers. The doors D² are actuated by means of the wheels of the carriages F contacting with them as the carriages enter or leave the furnace, while to the doors D are secured the inclined outwardly extending arms D′ which are designed to be engaged by the projecting hub of the plows or carriages, which latter lift the doors D as the carriages pass until they clear the stirrers D³ on said carriages, as shown in Fig. 4.

One of the essential features of my patent No. 402,619 before mentioned, was the formation of a vertical wall or partition along the sides of the hearths, to form supplemental chambers in which the carriages and operating chains or cables were located, so that they were cut off from the direct action of the heat, fumes and gases arising from the ore.

In Figs. 6 to 10ᵃ inclusive, I illustrate an improved form of wall or partition, which has been found to be very beneficial and of simple construction. This improved wall or partition E is formed of fire brick or other refractory material and consists of a lower portion e which is built in the floor of the furnace, and an upper portion e′ which depends from the roof but terminates short of the lower portion to form a narrow slot or opening between the two portions for the stirrer arms of the wheeled carriages to project through. In order that the upper portion e′ of the wall or partition may be suitably supported and removably attached, I employ a construction substantially like that shown in said Figs. 6 to 10ᵃ inclusive, and in which the upper portion of the wall or partition has a sheet metal backing g which supports the entire upper section of the wall on the back, and is bent up under its lower edge and along the front face a short distance to form a secure seat for said section. To the rear face of this backing g are secured hangers E² having slotted heads or jaws h at their upper ends, while in the arch or roof contiguous to said wall is a slotted bar F′ see Figs. 10 and 10ᵃ. Suitable bolts l and l′ have their inner ends provided with heads fitted in the slotted bar F′, the said bolts l extending downward through the slotted jaws h and provided with nuts by which they secure the upper section of the wall E in position, while the other bolts l′ extend upwardly through the arch or roof and are also provided with nuts. This construction enables me to form a rigid and solid wall the whole length of the furnace, while the peculiar hanging of the upper section e′ from the slotted bar also enables me to remove the section by loosening the nuts on the rods l and sliding the section endwise out of the furnace. To prevent the upper section of the wall or partition from becoming displaced by the shifting of the arch due to the action of the heat, a row of bricks F² in said arch is laid so as to project from the inner face of the arch contiguous to the section e′ to form a guard the entire length of the furnace in front of the wall. This construction also prevents the hangers E² and the upper section e′ from working forward, which, owing to its angular shape at the top, it is liable to do should the action of the heat in any degree loosen its fastenings. The hanger E² is also provided with a lug or projection E³ fitting an opening in the upper section e′ of the wall or partition, and thereby suspending the same from the hanger.

In my said former patent, I have illustrated and described track rails which occupy the supplemental chambers in which the wheeled carriages run, and in Figs. 11 and 12 of the present drawings I illustrate a very desirable means for securing said rails in position, and also supporting the pulleys over which the endless chains W pass. In these figures G indicates a suitable chair having recesses 12 formed near the ends for receiving the flanges of the rails. Clips G' confined in place between the flanges of the chair, engage the opposite sides of the rail flanges and are held in position against said flanges and against studs $G^3$ rising from the floor, by means of pins or spikes $G^2$ whereby a solid support is given the rail. To form a support for the small chain-carrier wheel $G^5$ the standards $G^4$ are cast or otherwise secured to the middle portion of the chair, and their upper ends form a box or bearing in which the shaft or journal of the wheel $G^5$ is mounted. The chair is placed between the walls of the furnace H, and the lower section of the wall or diaphragm E and upon being keyed in place forms a rigid support for the track as well as the wall itself.

In the character of furnaces described having two or more hearths one above the other, it has been found by experience that the difficulty of keeping up the horizontal wall or partition between two hearths was a serious objection. Owing to its great weight, as well as to the fact that it was heated from above and below, the pressure on the side walls was enormous and very difficult to control. To more nearly equalize the strain and prevent this lateral pressure on the walls of the furnace, I have adopted the construction shown in Figs. 13, 14 and 15, wherein I represents an arch formed laterally across the furnace, and I' is a series of cross arches having their thrust at right angles thereto, or longitudinal of the furnace. Skew-backs for these arches are formed, preferably, by means of two T-rails $I^2$ located between the ends of the arches with their heads in contact as shown in Fig. 13. From these skew-backs the arches are sprung, while the spaces between the arches form passages extending through the sides of the furnace and providing for a free circulation of air. The brick work of the arches is so arranged as to leave a hollow space entirely across the furnace, to admit of a free circulation of air to keep the skew-backs themselves cool, while the ends of the skew-backs are provided with rods $I^6$ having threaded outer ends (see Fig. 15) arranged to clamp the buck-stay $I^7$ thereby making the T-rails serve both as skew-backs and as the clamping rods for bolting the furnace together. The skewbacks may be formed of brick or tiling and the clamping rods so put in as to pass across the furnace through the hollow formed by the arches, but I prefer the construction noted above, wherein the skew-backs are formed by rails, as they will carry all the weights of the hearth, and relieve the walls entirely of this lateral pressure.

Having thus described my invention what I claim as new and desire to secure by Letters Patent, is:—

1. In an ore roasting furnace the roasting hearths thereof located one above the other, and a conveyer extending transversely through the horizontal wall or partition between said hearths and leading to the outside of the furnace, said wall or partition having an opening through which the material is fed by the conveyer to the roasting hearth to be mixed with the ore thereon.

2. In an ore roasting furnace, the roasting hearths arranged one above the other a tube extending transversely through the horizontal wall or partition between the hearths, and a chute or spout leading therefrom through the arch or roof, in combination with a screw conveyer and actuating mechanism within said tube for feeding material to the chute or spout whereby it is deposited upon the roasting hearth to be mixed with the ore thereon.

3. In an ore roasting furnace having roasting hearths, located one above the other the combination of a tube extending transversely through the horizontal wall or partition between the hearths, a feed hopper communicating with the tube, a screw conveyer in said tube, and a chute or spout extending downwardly from the tube through the arch or roof for directing material upon the hearth to be mixed with the ore thereon.

4. In an ore roasting furnace having roasting hearths one above the other, and having fire boxes with flues communicating with said hearths, the combination of means for advancing and stirring the ore, a hopper or receiver within the end walls of the furnace below the plane of the lower roasting hearth, and immediately under the inlet arch from one of the fire boxes whereby the ore is collected in charges and maintained in a heated condition, substantially as herein described.

5. In an ore roasting furnace, having a roasting hearth with supplemental chambers along its sides, the walls or partitions forming said chambers, and each comprising a lower section rising from the floor of the hearth, and an upper section depending from the arch or roof, a slotted bar in said arch or roof, and intermediate devices whereby the upper section is suspended from said bar.

6. In an ore roasting furnace having main roasting hearths, the walls or partitions along the sides thereof forming supplemental chambers, said walls comprising lower and upper sections of tiling, a metal backing for the upper section, the metal hangers $E^2$ secured thereto having the slotted jaws $h$ and lug or projection $E^3$, a slotted bar located in the arch or roof, and bolts fitted to said bar and hangers and suspending the upper section, substantially as herein described.

7. In an ore roasting furnace, a two-part wall or partition extending along the sides of the main roasting hearths to form supplemental side compartments, means for suspending the upper section of the wall from the arch or roof of the hearth, and a projection F² from the arch or roof contiguous to the upper section of the wall to form a guard and prevent displacement of said section, substantially as herein described.

8. In an ore roasting furnace having main roasting compartments and supplemental compartments along the sides thereof, the pivotally hung doors D and D² at the ends of said main and supplemental compartments, said doors D having the inclined arms D' and wheeled carriages to engage said arms and open the doors, said carriages being provided with means for stirring the ore, substantially as herein described.

9. In an ore roasting furnace having roasting hearths, the wall or partition E therein consisting of an upper and lower section a metal backing for the upper section turned up at its bottom to form a seat therefor, the hangers E² provided with the slotted jaws h, and a lug or projection E² entering said section, and means for suspending said section from the arch or roof, substantially as herein described.

10. In an ore roasting furnace having a roasting hearth, the two-part wall or partition extending along the sides thereof to form supplemental compartments, the metal chair in said side compartments and bracing the lower section of the wall or diaphragm, track rails mounted on said chair, the clips secured against said rails and against stops or lugs G³ on the chair for securing the rails in position, and a pulley mounted within the central portion of the chair and supporting the weight of the chains which carry the stirring devices, substantially as herein described.

11. In an ore roasting furnace having side compartments, endless chains, and carriages having stirring devices and adapted to travel in said compartments, the metal chairs in said compartments having the standards G⁴ the pulley G⁵ mounted in said standards and supporting the endless chains, and track rails on said chair, substantially as herein described.

12. In an ore roasting furnace having upper and lower chambers with arched tops, the wall or partition between said chambers formed of arches extending in series in the direction of the length of the furnace and transverse of the arches of said chambers.

13. In an ore roasting furnace having upper and lower chambers, with arched tops the wall or partition between said chambers formed of arches extending in series in the direction of the length of the furnace and at right angles with the arches of the chambers, and T-rails between the adjoining ends of the series of arches.

14. In an ore roasting furnace having upper and lower chambers, with arched tops the wall or partition between the chambers formed of a series of arches arranged transversely of the main arches of the chambers, said series of arches having passages between their ends leading through the sides of the furnace, substantially as herein described.

HORACE F. BROWN.

Witnesses:
 GEO. K. FISCHER,
 BEN H. WILSON